United States Patent
Yost et al.

(10) Patent No.: US 6,560,442 B1
(45) Date of Patent: May 6, 2003

(54) SYSTEM AND METHOD FOR PROFILING THE LOCATION OF MOBILE RADIO TRAFFIC IN A WIRELESS COMMUNICATIONS NETWORK

(75) Inventors: George Yost, Desoto, TX (US); Clinton E. Harper, Dallas, TX (US); Shawn Kim, Wylie, TX (US)

(73) Assignee: Ericsson Inc., Richardson, TX (US)

(*) Notice: Subject to any disclaimer, the term of this patent is extended or adjusted under 35 U.S.C. 154(b) by 0 days.

(21) Appl. No.: 09/373,313

(22) Filed: Aug. 12, 1999

(51) Int. Cl.[7] .............................................. H04B 17/00
(52) U.S. Cl. ..................................... 455/67.1; 455/67.6
(58) Field of Search .............................. 455/67.1, 67.6, 455/67.7, 456, 457, 226.2, 226.1, 405, 408, 423, 424, 425

(56) References Cited

U.S. PATENT DOCUMENTS

| | | | |
|---|---|---|---|
| 5,023,900 A | * 6/1991 | Tayloe et al. | 379/32.01 |
| 5,095,500 A | * 3/1992 | Tayloe et al. | 379/32.01 |
| 5,418,843 A | * 5/1995 | Stjernholm | 379/111 |
| 6,167,259 A | * 12/2000 | Shah | 370/329 |
| 6,219,544 B1 | * 4/2001 | Suutarinen | 455/422 |
| 6,230,018 B1 | * 5/2001 | Watters et al. | 340/988 |
| 6,249,680 B1 | * 6/2001 | Wax et al. | 370/335 |

* cited by examiner

Primary Examiner—Vivian Chin
Assistant Examiner—Tu Nguyen

(57) ABSTRACT

A method for locating concentration of mobile radio (MR) traffic in a coverage area 50 by identifying the locations where MRs (12) in the coverage area 50 are actively making calls. Signal strength measurements at test sites (40) of interest within the coverage area (50) are made and compared with signal strength measurements taken from operating MRs (12). A plot of matches can be kept and used to traffic the locations within the coverage area (50) revealing where concentrations in the coverage area (50) exist.

18 Claims, 3 Drawing Sheets

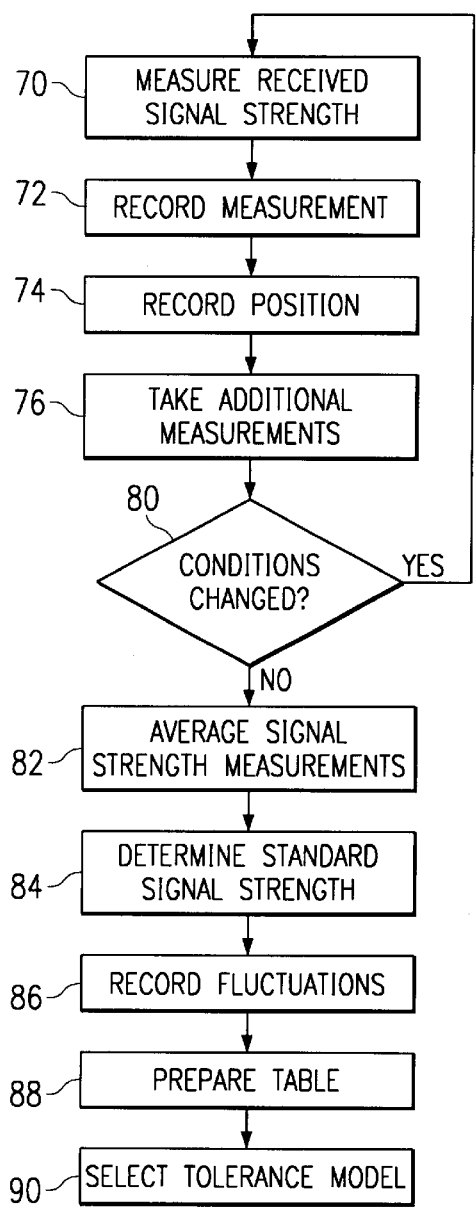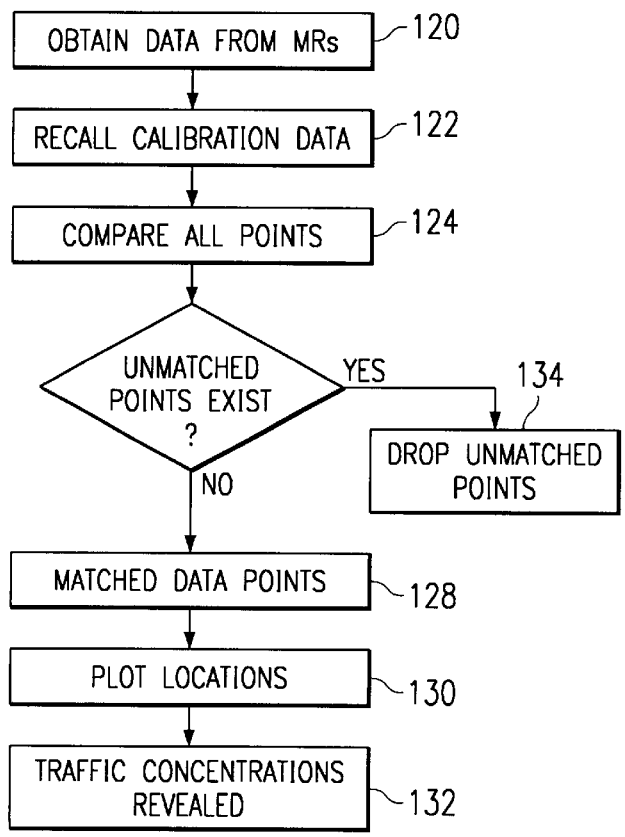

SYSTEM AND METHOD FOR PROFILING THE LOCATION OF MOBILE RADIO TRAFFIC IN A WIRELESS COMMUNICATIONS NETWORK

TECHNICAL FIELD

This invention relates generally to wireless communications, and more particularly to a system and method for profiling the location of mobile radio traffic across a coverage area served by one or more base transceiver stations.

BACKGROUND OF THE INVENTION

Wireless communication technology has experienced unprecedented growth, fueled by advances in radio frequency, satellite, and microelectronic technologies and by the convenience of access to portable wireless devices. Several technologies have emerged for providing wireless communications, including analog systems such as Advanced Mobile Phone System (AMPS), and digital systems such as Global System for Mobile Communications (GSM) and Digital AMPS (D-AMPS). In general, such technologies fall into the class of "cell-based" or cellular radio systems.

Cellular radio systems operate in interference-limited environments which rely on frequency reuse plans and Multiple Access techniques such as TMDA, FDMA, and CDMA, to maximize capacity. Because bandwidth and radio spectrum are limited resources shared by all users in the system, schemes to divide the available network bandwidth among as many subscribers as possible are often employed.

Currently, the volume of traffic in a system is estimated at the level of a base station coverage area by the use of Mobile Switching Center (MSC) statistics. To further determine the locations of traffic concentrations within a base station coverage area, service operators depend on customer complaints, drive tests, and visual inspections. For example, if a base station has a great deal of radio traffic on weekday mornings and evenings, and the base station covers a major highway between the city center and suburbs, it can be assumed that much of the radio traffic is coming from commuters on the highway. The locations of traffic concentrations can be measured only by a complex and expensive process involving use of a lower power Mobile Radio (MR) base station placed in areas of interest (e.g., near suspected concentrations) and by determining the fraction of mobile units that receive the signal strongly. A simple means of measuring the location of this traffic and identifying the areas of concentrations is lacking. Proposed solutions for identifying the positions of MRs when making emergency calls, for example, are complex or require specially-equipped MRs and, as such, are not suited to measuring large-scale traffic patterns.

At the same time, when the demand for network resources becomes great, and the volume of traffic on the system outpaces the capabilities of the network, the network manager may be required to make changes and/or redesigns in order to accommodate the increase in demand. There is currently no relatively simple and inexpensive technique for the location of MR traffic in a MR system. As such, geographic studies for the purpose of network analysis and possible improvement are needed so that traffic concentrations that might require additional capacity may be identified.

Specifically, until the present invention, there was no way to measure what percentage of traffic may be originating from one or more locations in a cell coverage area. Thus, if two major highways are serviced by one base station, there was no reliable way of determining what percentage of the total radio traffic is provided by each highway Such information would be useful in influencing system expansion plans.

Even when mobile positioning systems come into widespread use, it may not be easy to determine the positions of the MRs of interest, either because of the system congestion that would be caused by attempting positioning on every active MR in the coverage area, or because of privacy issues.

SUMMARY OF THE INVENTION

The present invention provides a method and system for profiling the location of MR traffic that does not require any data other than that which is already being gathered by the base transceiver stations. Using the invention, an operator may determine the locations where the MR traffic is concentrated and use the information gained to make system design decisions related to traffic handling. An example of a traffic-related problem would be an increase in the number of dropped calls or system access failures during periods of high traffic. If, for example, it could be established that a large portion of the traffic originates in a small area, the operator could consider establishing a micro cell to increase capacity in the area. One use of this invention is for making that sort of determination.

Disclosed is a method of profiling locations of MR traffic within a coverage area of a wireless communications network, the network including a plurality of base transceiver stations (BTSs) and one or more test measurement devices configured to make signal strength measurements from the BTSs to a plurality of points within the coverage area. The method comprises the step of causing the devices to make a set of signal strength measurements from a plurality of test sites contained within the coverage area. Next, the signal strength measurements are recorded and the BTSs are made to take a set of signal strength measurements for live MR traffic within the coverage area at any time when the distribution of MR traffic is desired. The test site signal strength measurements are compared with the MR signal strength measurements to determine if they match. If so, each match is recorded to determine the location of mobile traffic within the coverage area. If a match is not encountered, then the data is discarded.

The step of causing the devices to make a set of signal strength measurements can be performed at a plurality of locations, intervals and across all frequencies of interest within the coverage area. Preferably, they are performed at locations of potential interest within the coverage area. Also, a set of signal strength measurements can be made away from the location of the sites of potential interest in order to determine a falloff of intensity.

Also disclosed is a method of profiling MR traffic concentrations in a coverage area served by a plurality of BTSs within a wireless communications network. The method comprises the step of obtaining a set of calibration signal strength measurements for all BTSs within the coverage area. Next, signal strength measurements are made from all MRs within the coverage area and are compared to the calibration signal strength measurements to determine if they match. By obtaining a set of calibration signal strength measurements across all signal frequencies within the network, a plot of MR traffic concentration levels across the network can be obtained.

Further disclosed is a system for profiling the concentration of MR traffic within a coverage area of a wireless communication network. The system includes a plurality of BTSs located near or within the coverage area. At least one signal strength measuring device is provided and configured to measure the signal strength of each BTS from a plurality of locations within the coverage area. The system further includes a plurality of MRs serviced by the plurality of BTSs so that the serving BTS is able to request the MRs to measure and report the signal strengths of the BTSs as they communicate within the coverage area. The signal strength measuring device(s) can incorporate Global Positioning System (GPS) receivers.

A technical advantage of the invention is that it allows an operator to periodically monitor the geographical distribution of traffic to look for changes that might require adjustments in service and permits the network manager to proactively anticipate traffic-density problems.

Another technical advantage of the invention is the matching of calibrated signal strengths in various areas with those measured by active mobile units in the cell. This enables the geographical distribution of the callers to be determined at any time in order to diagnose traffic-related problems.

BRIEF DESCRIPTION OF THE DRAWINGS

The above features and advantages of the present invention will be more clearly understood from consideration of the following detailed description taken in connection with the accompanying drawings in which;

FIG. 4 is a process flow diagram illustrating the calibration phase of the profiling method of the invention according to one embodiment;

FIG. 6 is a process flow diagram illustrating the data analysis phase of the profiling method of the invention according to one embodiment.

Corresponding numerals and symbols in the figures refer to corresponding parts in the detailed description unless otherwise indicated.

DETAILED DESCRIPTION OF PREFERRED EMBODIMENTS

The invention is a method for locating mobile radio (MR) traffic in a wireless communications network coverage area by identifying the locations where the MRs are actively making calls. The system consists of a network of cells in which all MRs are measuring the radio signal strength of a serving base transceiver station (BTS) and the radio signal strengths of the neighboring BTSs for handoff control purposes. In practice, the received signal strengths of only certain channels (radio frequencies) from the neighboring BTSs are measured.

The radio signal strength measurements made by the MRs are being sent to, and recorded by, the MR control system.

It should be understood that the discussion of measured signal strengths at certain radio frequencies apply to MR systems other than a Code Division Multiple Access (CDMA) system. In a CDMA system, the base station PN Offset would be monitored instead of radio frequency, and $E_c/I_o$ (chip energy to total noise and interference ratio) is monitored instead of signal strength. With these understandings, the basic principle is the same and this invention applies equally to both CDMA and non-CDMA systems.

Figure 1:
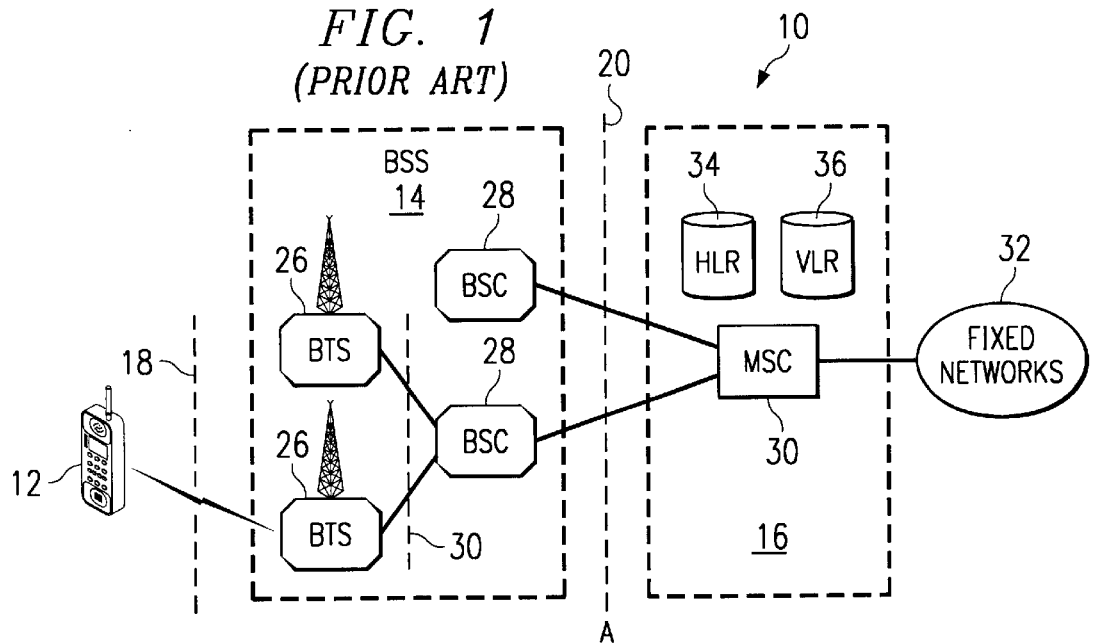
FIG. 1 is a diagram illustrating the primary components of a wireless communications network in which the invention can be practiced.

FIG. 1 is a diagram of a wireless communications network 10, according to the prior art which illustrates the primary components of a cellular radio network in which this invention can be practiced. Specifically, the network 10 comprises a wireless telephony network including an originating mobile radio (MR) 12. The originating MR 12 is typically a wireless communication device comprising a wireless cellular-type mobile station, such as a Personal Communications Service (PCS) or cellular phone, but may also include a computer, a Personal Digital Assistant (PDA), or other wireless terminal, for example.

The Base Station Subsystem (BSS) 14 comprises two parts: the Base Transceiver Station (BTS) 26 and the Base Station Controller (BSC) 28, although in some wireless networks, the BSC 28 is not used. If used, the BTS 26 communicates across a standardized Abis interface 30 with BSC 28, allowing operation between components. In general, BTS 26 houses radio transceivers that define a cell and handle the radio-link protocols with the MR 12. In a large urban area, there may be a large number of BTSs 26 deployed. BSC 28 manages the radio resources for one or more BTSs 26, and, as such, there may be several BSCs 28 within a single BSS 14. Among the functions of the BSC 28 are radio-channel setup, frequency hopping, and handovers. In addition, BSC 28 provides a connection mechanism between the MR 12 and the Master Switching Center (MSC) 30 of network subsystem 16 which acts as the interface to one or more fixed networks 32. In networks that do not employ a BSC 28, its functions are performed in the MSC 30 or BTS 26.

The central component of the network subsystem 16 is the MSC 30, which acts like a normal switching node of the Public Switched Telephone Network (PSTN), and also provides all of the functionality needed to handle a mobile subscriber, such as registration, authentication, location updating, handovers, and call routing to roaming subscribers. These functions are provided in conjunction with several other network entities, which together form the network subsystem 16.

The MSC 30 provides the connection mechanism between the MR 12 and the fixed network 32 which may include the PSTN or an Integrated Service Digital Network (ISDN), for example. The Home Location Register (HLR) 34 and Visitor Location Register (VLR) 36, together with the MSC 30, provide call routing and roaming capabilities within the network 10. In particular, the HLR 34 contains administrative information for the subscribers registered in the network 10, along with the current location of the MS 12. Likewise, the VLR 36 contains selected administrative information from HLR 34 necessary for call control and provisioning of the subscriber services for each mobile currently located in the geographical area controlled by the VLR 36. Other registers are used for authentication and security functions within the network subsystem 16.

The present invention provides a method for locating MR traffic concentrations in the service coverage area of a Public Land Mobile Network (PLMN) such as the wireless network 10 of FIG. 1. A profiling method is provided wherein the operator will first, within a chosen base station coverage area, measure the received signal strengths of the serving BTS and all neighboring BTSs in and around all areas of interest. For the serving and neighboring base stations, the frequency measurements will be the same ones monitored by a MR, and recorded by the MR control system, such as the BTS, BSC or MSC, to determine the desirability of a handoff. Normally, these are referred to as the base station control channels.

Calibration measurements are made by a testing device frequently and at a plurality of positions within and around locations of interest in order to determine the effects of fading within the coverage area of the network 10 and, in particular, the service area of the BTS 26. Preferably, they are made so as to duplicate as closely as possible the conditions of actual users. For example, if measurements are to be made on a highway, the testing device should be within a car. If made in a pedestrian area, the testing device should be held by a pedestrian. In this manner, the signal strengths will duplicate the ones experienced by the actual MR traffic. The measurements must include a record of the position of the testing device when the measurement was recorded. This may be determined either by a GPS receiver connected to the testing device or by hand recordings on maps, carefully correlated with the data measurement taken at the test sites.

Figure 2:
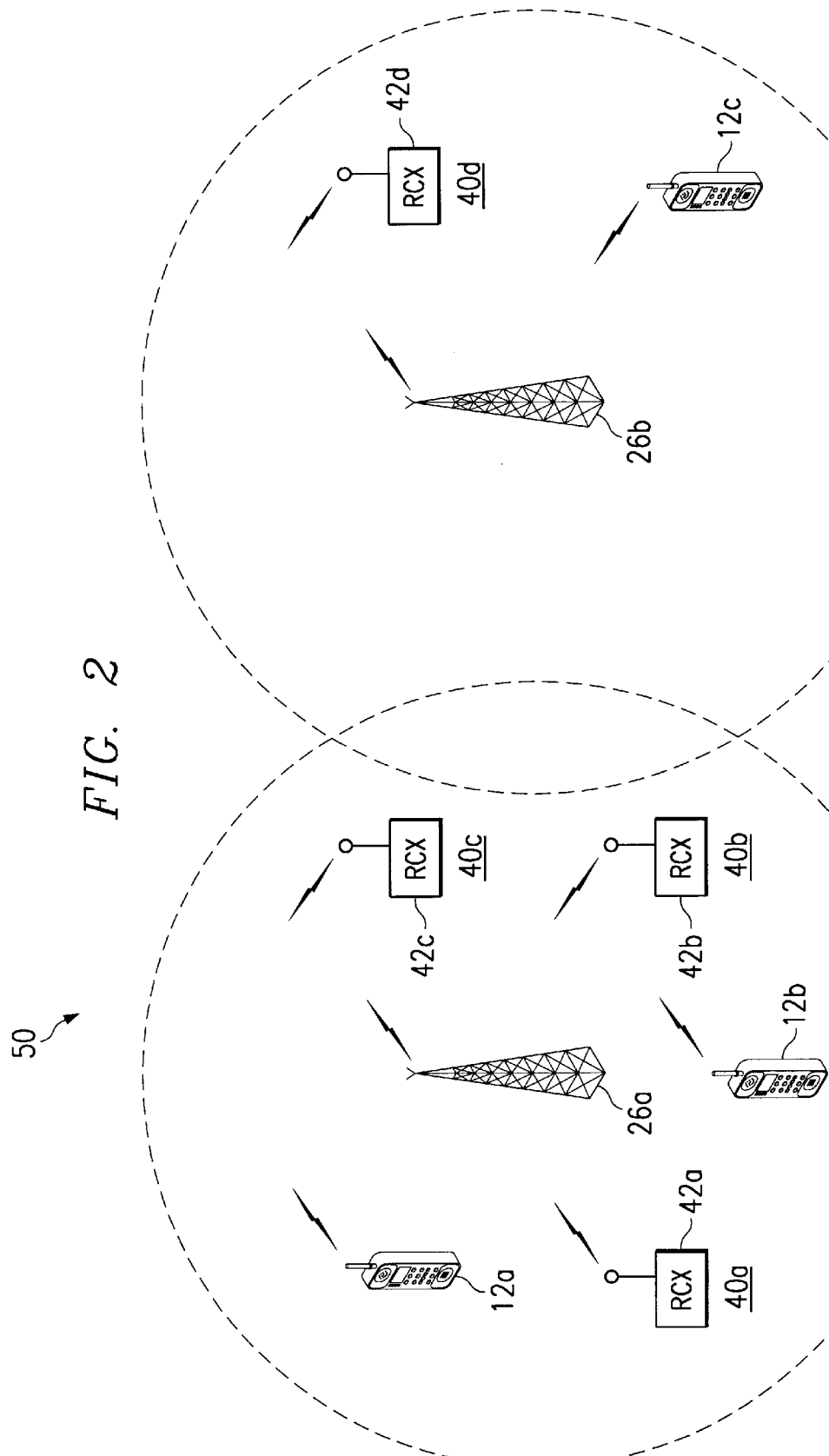
FIG. 2 shows the necessary components of a system for profiling the location of mobile traffic within a coverage area served by two (2) base transceiver sets.

To better understand the invention, reference is made to FIG. 2 which illustrates a coverage area 50 (indicated by dashed circles) of a wireless communications network or PLMN. The coverage area 50 includes two (2) BTSs 26A, 26B, (referred to as 26 collectively) which are predisposed and configured to provide service to the wireless MRs 12A, 12B and 12C (referred to as 12 collectively). The signal strength between a particular MR 12 and the corresponding servicing BTS 26 is a function of numerous factors, including the distance between the MR 12 and the BTS 26, the number of other MRs 12 within the same coverage area 50, the amount of interference within the coverage area 50, and any obstructions or other forces which may affect the signal strength within a coverage area 50.

In order to practice the MR traffic profiling method of the present invention, a set of prior measurements of the signal strengths of each BTS 26A, 26B that can be received with adequate signal strength is required. These measurements must be made at a plurality of positions at or near those for which the MR traffic concentration(s) is desired. Locations 40A, 40B, 40C, and 40D (referred to as 40 collectively) illustrate such positions within the coverage area 50. Signal strength measuring or testing devices 42A, 42B, and 42C (referred to as 42 collectively) may be transported to any desired location within the coverage area 50. A plurality of measurements should be made at and around each desired location. The test site locations may coincide with known locations of heavy vehicular traffic, or other regions where problems might be suspected. These measurements shall be referred to as calibration measurements. It is not necessary to record calibration measurements over the entire coverage area 50.

Each measurement must be recorded with its position. In one embodiment of this invention, a GPS is used for this purpose.

It is adequate to perform one set of measurements and retain the results for use whenever needed. However, if the terrain or the structures of the cell change, a new set of calibration measurements may be required.

As shown, the MRs 12A, 12B and 12C are disposed throughout the coverage area 50 for communicating with a serving BTS 26A. BTS 26B, and other BTSs, may also be received by the MRs and their signal strengths measured during active operation. As a particular MR 12 roams through the coverage area 50, the signal strength between the mobile 12 and the serving BTS 26 can vary, depending on its location and position within the coverage area 50 with respect to such BTS 26. The signal strengths of the other BTSs as received by the MR 12 may also vary. These variations may be routinely reported by the MR 12 to the MR control system.

An example of the measured signal strength as a function of base station 26 and MR 12 is illustrated in Table 1 for the coverage area 50. In practice, many additional base stations 26 may also be received and measured by the MRs.

TABLE 1

Measured Signal Strength for MR Traffic in Coverage Area

| Base Station | Mobile | Measured Signal Strength (dBm) |
| --- | --- | --- |
| 26a | 12a | −88 |
| 26a | 12b | −93 |
| 26a | 12c | −110 |
| 26b | 12a | −108 |
| 26b | 12b | −102 |
| 26b | 12c | −87 |

The invention relies on the fact that the MRs 12 are capable of measuring the radio signal strength of a serving BTS 26 as well as the radio signal strengths of neighboring BTSs for handoff control purposes. In this way, the invention provides a relatively simple and inexpensive technique for the location of MR traffic in a MR system.

Figure 3:
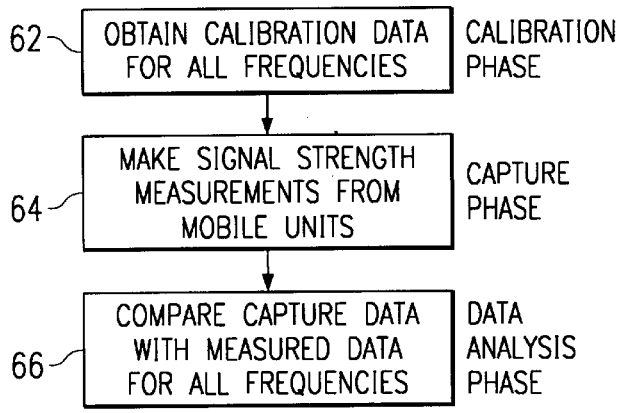
FIG. 3 is a process flow diagram illustrating the primary steps to profile mobile traffic according to one embodiment of the invention.

With reference to FIG. 3, therein is shown a process flow diagram for the profiling method of the present invention, denoted generally as 60. The profiling method 60 comprises 3 separate phases: a calibration phase, a capture phase and a data analysis phase. During the calibration phase, the network manager is able to obtain calibration data for all MR frequencies within the coverage area 50 (step 62). Next, during the capture phase, signal strength measurements are made from all MR 12 within the coverage area 50 (step 64). The data analysis phase amounts to a comparison of the captured data from the MR 12 with the calibration data (step 66).

In one embodiment, additional calibration measurements are taken away from the primary traffic areas and/or the location of the original test sites 40. The purpose of this is to determine if the measurements are sufficiently accurate to see the fall-off of intensity with distance from suspected concentrations. The positioning accuracy will vary within base station coverage areas, depending on the fading environment and the number of neighboring base stations the MR 12 can receive. Therefore, a determination of accuracy by means of measurements near the desired areas can be performed.

Following is a detailed description of the three phases of the profiling method 60, according to the invention.

Calibration Phase

FIG. 4 is a process flow diagram that illustrates the calibration phase of the profiling method 60 of the invention, according to one embodiment. In general, one or more test devices 42 are placed within the coverage area of interest and a set of "calibration" data points or signal strength measurements at each test site 40 are taken. It may not be necessary to calibrate the entire coverage area 50. Only areas of interest need to be calibrated. Limiting the areas under calibration will reduce the time and cost of the procedure and also reduce the complexity of the final analysis.

The calibration phase begins (step 70) when the test device 42 measures the received signal strengths from the BTS 26 and all other BTSs with adequate signal strength to be measured within the coverage area 50. Next (step 72), the received signal strength measurements are recorded along with the position of the test devices 42 (step 74).

The test devices 42 can be moved somewhat away from the primary traffic areas so that additional measurements can be taken (step 76). These will be used during the data analysis phase to determine if, after analysis, the position determinations are sufficiently accurate. For example, locations away from the primary traffic areas would show a falloff of intensity, thereby verifying the validity of MR positioning within primary traffic areas. The positioning accuracy will vary depending on the fading environment and the number of neighboring BTSs the MR can receive.

Process flow is directed to step 80, wherein a determination is made if conditions in the coverage area 50 have changed. For example, a major construction project might change the fading environment. If so, process flow is directed to step 70 wherein a new set of calibration data points is obtained by measuring received signal strength at the test sites 40. If not, then the calibration data containing the measured and recorded signal strength measurements are averaged within each of a plurality of small areas (step 82) and a standard set of signal strength measurements is determined (step 84), which would apply across the coverage area of interest.

The averages are made of all measurements within a limited distance. This distance should be chosen to be smaller than the desired positioning accuracy. For example, if the desired accuracy is 200 m, then it would be reasonable to average all measurements made in a given 100 m span. Smaller spans may be used if more calibration measurements are available within that span. Observed fluctuations about the standard signal strength measurements within each small area are recorded (step 86) to form the basis of a statistical calculation with standard deviations from the average.

The profiling method 60 may be applied many times over a period of time, if desired. Calibration measurements need only be done once unless conditions in the area change (step 70). For example, new construction might change the pattern of signal strengths, or new base stations may be constructed.

The calibration signal strengths measure an average over small areas of a pre-determined size. With these averages, a standard set of signal strengths for the coverage area can be determined, with some of the effects of fast fading removed. In addition, the fluctuations observed for each BTS (serving and neighboring) about the average can be recorded and used to determine tolerances in the processing that follows.

A table can be prepared (step 88) containing the data for each area. For each frequency, the averaged measured signal strength and the tolerances measured from the fluctuations in the small calibration areas are recorded. The tolerances may take the form of statistical standard deviations (step 90), or they may take the form of the upper and lower absolute limits of the fluctuations, or they may take the form of an upper and lower boundaries (e.g., 50%, 90%, etc.) of the spread of the measurements. The choice would be made by the network manager based on the use to which it will be put, plus the user's experience and perhaps simulations.

Capture Phase

Figure 5:
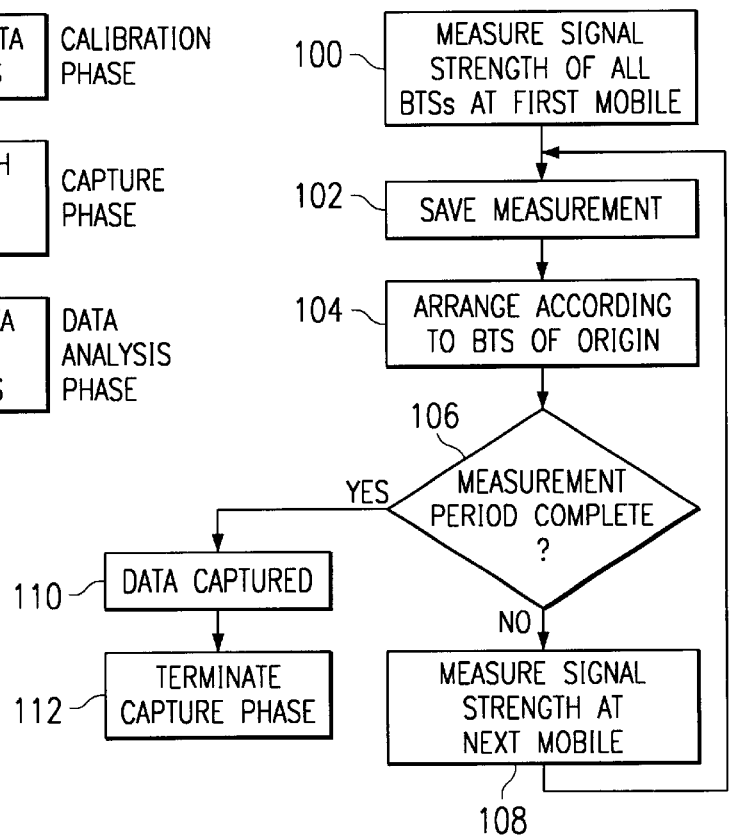
FIG. 5 is a process flow diagram illustrating the capture phase of the profiling method of the invention according to one embodiment.

The process of recording the BTS signal strength measurements for the MRs 12 whose geographical distribution is desired is illustrated in FIG. 5 as a process flow diagram. This is the "capture" phase. During periods when traffic-sensitive problems are occurring, all such measurements should be saved for analysis. In one embodiment, the actual calls causing the traffic-sensitive problems are the ones used for analysis. This data will be called the "captured" data, since it is obtained from MR users (step 100). The captured data is saved, (step 102) for all frequencies within the coverage area of interest. The process continues for a period of time as determined by need. This will depend on the period of time during which the problems are occurring and on other factors (such as the desirability of collecting more data to reduce random statistical errors). The same MRs will be repeatedly processed throughout that time as long as they have a call in progress.

For each measurement from each MR, the measured signal strengths are arranged according to the BTS of origin (step 104) in the same manner as the calibration data are arranged. The difference is that there is no data on tolerance necessary for the actual calls since the tolerances have been measured during the calibration. Also, there is no averaging necessary, although according to one embodiment, the amount of data processing is reduced by averaging the captured data over short time intervals.

The capture phase continues until the measurement period is complete (step 106). If not complete, process flow continues (step 108) wherein the signal strength from another MR is measured and then saved (step 102) to increase the accuracy of the data analysis. Once the measurement period is complete, then the data is considered captured (step 110) and the capture phase is terminated (step 112).

Data Analysis Phase

After the calibration and capture phases are complete, then the data may be analyzed to determine the positions of the MRs whose data was captured. FIG. 6 is a process flow diagram illustrating the data analysis phase of the invention in more detail. For each MR, the full set of data measured at each capture point are collected (step 120). This includes the measured signal strength of each BTS received by the MR. The calibration data is recalled (step 122) and the full set of signal strengths is compared with the full set of signal strengths measured in the calibration phase (step 124).

For example, if the received signal strengths of BTS 1 through 5 are measured as in the first row of Table 2, they may be compared with the simulated calibration measurements at positions 1 through 10.

TABLE 2

Comparison of Signal Strengths (SS), in dBm, captured for one MR measurement with several Calibration points. The agreement is best for position 5.

|  | BTS 1 | BTS 2 | BTS 3 | BTS 4 | BTS 5 |
| --- | --- | --- | --- | --- | --- |
| Captured SS | −88 | −99 | −100 | −97 | −115 |
| Cal. SS Position 1 | −99 | −87 | −110 | −88 | −112 |
| Cal. SS Position 2 | −94 | −102 | −97 | −97 | −107 |
| Cal. SS Position 3 | −77 | −88 | −94 | −96 | −88 |
| Cal. SS Position 4 | −87 | −110 | −88 | −95 | −115 |
| Cal. SS Position 5 | −87 | −99 | −101 | −97 | −116 |
| Cal. SS Position 6 | −108 | −110 | −92 | −88 | −100 |
| Cal. SS Position 7 | −100 | −99 | −88 | −94 | −88 |

TABLE 2-continued

Comparison of Signal Strengths (SS), in dBm, captured
for one MR measurement with several Calibration points.
The agreement is best for position 5.

|  | BTS 1 | BTS 2 | BTS 3 | BTS 4 | BTS 5 |
| --- | --- | --- | --- | --- | --- |
| Cal. SS Position 8 | −100 | −110 | −99 | −110 | −88 |
| Cal. SS Position 9 | −99 | −93 | −110 | −88 | −99 |
| Cal. SS Position 10 | −101 | −113 | −112 | −105 | −91 |

The determination of the position of a MR at the time the data was captured is achieved by looking for the best match. From visual study of Table 2, we see that, although the agreement between captured and calibrated data is very good for individual BTSs at several positions, the overall agreement is best for Position 5 and, thus, a match has been found which can be repeated for all data points (step 128). Therefore, we would conclude that position 5 is the most likely position of this MR at the time the data was captured.

Note that the agreement is not necessarily perfect between the calibration data of Position 5 and the captured data, but that it is quite close. In practice, the operator would define "close" using statistical techniques that take advantage of the variances that were measured during the calibration phase. In one embodiment of this invention, if the operator has measured tolerance $t_i$ for BTS number i at a particular calibration position, and if the difference between calibration and capture data for that same BTS is $d_i$, then the chisquared formula of equation 1 may be used:

$$X^2 = \Sigma_i (d_i/t_i)^2 \qquad \text{Equ. 1}$$

The sum is over all BTSs whose signals were measured during the calibration phase. The best match is that match that has the smallest value of $X^2$. The operator would define an upper limit to the value of $X^2$ that is acceptable. If none of the calibration points is in agreement with a particular capture point (with $X^2$ that is less than this maximum value), then that capture point is defined as being outside of the calibration area and is dropped (step 134) from further consideration. It should be understood that other methods of arriving at the best match can be used as is known to those of ordinary skill in the art. This step reduces the amount of data that must be managed and displayed. In one embodiment, the discarded data is recorded and analyzed as a useful statistic to help the operator determine what portion of the traffic is outside the calibration area(s).

In practice, there may be a large number of calibration data positions and a large number of captured data points. As such, a computer algorithm may be used to search and analyze all the data points to find the best agreement.

In another embodiment, the operator decides to record as a match all positions for which agreement satisfies certain pre-defined criteria. If so, a single captured data point might result in more than one match. The advantage for doing this would be to guarantee that the correct match would not be missed. The disadvantage would be that the reliability and accuracy of the resultant traffic density survey would be reduced by the inclusion of a certain number of capture points that have multiple matches, of which at least some must be false.

According to another embodiment, the number of false matches could be reduced by analysis of the behavior of the same call from one measurement to the next. That is, since any given call would normally result in a plurality of capture points, it would be possible to reject false matches by use of an algorithm that looked at the set of all matches from that call, arranged in order by time. False matches would be identified as matches that are geographically distant from the main trend of the matches generated by that call.

The locations of each of the captured points are then plotted on a map (step 130). The user may choose to plot only the data captured in a brief time interval, but more likely the advantages of extra data will make it desirable to use data from many brief time intervals or from a longer period of time.

If the measurements are accurate enough, any traffic concentrations will become apparent (step 132). If the measurements are not sufficiently accurate, then most of the calibration area, including the areas away from the suspected concentrations, will be more or less evenly populated. This demonstrates the purpose of taking some calibration points a little distance removed from any suspected high traffic areas. Only if the number of measurements found to match these points is significantly less than at one or more of the suspected high traffic areas can the accuracy be regarded as sufficient to identify a traffic concentration.

The accuracy of the measurements improves as the number of neighboring base stations increases. This helps pin down the location where a call is coming from. For example, near one edge of a base station coverage area, neighboring BTSs on the opposite side may have very low or imperceptible signal strength; near the other edge, the opposite is most likely true. With enough BTSs contributing, most areas should have a unique pattern of signal strengths since regions likely to contain traffic concentrations are also likely to have a relatively high number of neighbor base stations.

While the invention has been described with a reference to illustrative embodiments, this description is not intended to be construed in a limiting sense. Various modifications and combinations of the illustrative embodiments as well as other embodiments of the invention, will be apparent to persons skilled in the art upon reference to the description. It is, therefore, intended that the appended claims encompass any such modifications or embodiments.

What is claimed is:

1. In a wireless communications network including a plurality of base transceiver stations (BTSs) and at lease one testing device configured to make signal strength measurements from the BTSs, a method of profiling locations of mobile radio (MR) traffic within coverage areas served by the BTSs comprising the steps of:

(A) causing said testing device to make initial calibration signal strength measurements for signals from said BTSs;

(B) recording said initial calibration signal strength measurements and associated locations where said initial calibration signal strength measurements were made;

(C) causing said MRs to make signal strength measurements from the BTSs within said coverage area;

(D) comparing the signal strength measurements made by each of said MRs with the initial calibration signal strength measurements to determine a best match for each MR;

(E) recording as a location for each MR, the location associated with the initial calibration signal strength measurement of the best match for each MR;

(F) determining whether radio propagation conditions within the coverage areas have changed since the initial calibration signal strength measurements were made:

(G) upon determining that radio propagation conditions within the coverage areas have changed, causing the testing device to make updated calibration signal strength measurements for signals from said BTSs; and (H) repeating steps B through E utilizing the updated calibration signal strength measurements in place of the initial calibration measurements.

2. The method of claim 1 wherein the step of causing said test devices to make a set of signal strength measurements is performed at a plurality of locations.

3. The method of claim 1 wherein the step of causing said test devices to make a set of signal strength measurements is performed over many frequencies of the wireless communications network.

4. The method of claim 1 further comprising the step of validating the recorded MR locations by repeating steps A through E for locations away from primary traffic areas.

5. The method of claim 3 further comprising the step of preparing a table containing each match as a function of frequency across the coverage area.

6. The method of claim 1, further comprising the step of calculating the average measured signal strength for a plurality of small areas in the coverage area.

7. The method of claim 6 further comprising the step of calculating the tolerance for each average of signal strength for said plurality of small areas in the coverage area.

8. The method of claim 1 further comprising the step of discarding signal strength measurements for MR traffic that had no match for signal strength measurements from said testing device.

9. The method of claim 1 wherein said step of comparing the signal strength measurements made by each of said MRs with the initial calibration signal strength measurements is performed using a chisquared equation summed over all frequencies within the wireless communications network.

10. A method of profiling mobile traffic concentrations in the coverage area served by one or more base transceiver stations within a wireless communications network, the method comprising;

obtaining a set of calibration signal strength measurements for all base stations within the coverage area;

recording an associated position with each of the calibration measurements;

at each of the base station within the coverage area, measuring the signal strength from mobiles within the coverage area;

comparing the calibration signal strength measurements with the measured signal strength from mobiles within the coverage area to determine when there is a match within a tolerance;

recording the associated positions of matches within the coverage area;

periodically repeating the calibration measurements for selected positions within the coverage area;

determining from changes in the calibration measurements, when radio propagation conditions have changed within the coverage area; and obtaining a new set of updated calibration measurements for all base stations within the coverage area whenever it is determined that the radio propagation conditions have changed.

11. The method according to claim 10 wherein said step of obtaining a set of calibration signal strength points is performed at a plurality of position and across many frequencies within the network.

12. The method according to claim 10 further comprising the step of taking additional measurements outside the primary traffic areas in the network to determine the accuracy of calibration signal strength measurements.

13. The method according to claim 10 further comprising the steps of:

obtaining a set of calibration signal strength points at a plurality of locations and across many frequencies within the network;

preparing at table for a plurality of small areas within the coverage area; and determining the average measured signal strength for each small area and the deviation from the average.

14. The method according to claim 13 further comprising the step of calculating the standard deviation from the average measured signal strength for each said small area within the coverage area.

15. A system for profiling the concentration of MR traffic within a coverage area of a wireless communications network comprising:

a plurality of base transceiver stations (BTSs) located within said coverage area;

at least one testing device configured to make calibration measurements of the signal strength of said BTSs at each location where said testing device can be located within said coverage area, and to record an associated location for each calibration measurement;

a plurality of mobile radios (MRs) within the transmission range of said BTSs;

means for recording the calibration measurements made by said testing device along with the associated locations;

means for comparing said calibration measurements with the measured signal strength of said plurality of MRs, and for determining a best match;

means for determining whether radio propagation conditions within the coverage area have changed since the calibration measurements were made; and means for causing the testing device to make updated calibration measurements of the signal strength of the BTSs at each location where the testing device can be located within the coverage area.

16. The system according to claim 15 wherein said testing device includes a GPS receiver for determining the location associated with each calibration measurement.

17. The system according to claim 15 further comprising means for validating the accuracy of calibration signal strength measurements by taking additional calibration measurements outside primary traffic areas in the network.

18. The system according to claim 15 wherein the means for determining whether radio propagation conditions within the coverage area have changed since the calibration measurements were made includes:

means for periodically causing the testing device to repeat the calibration measurements for selected positions within the coverage area; and means for determining from changes in the calibration measurements, whether radio propagation conditions have changed within the coverage area.

* * * * *